US007776951B2

(12) United States Patent
Hirayama et al.

(10) Patent No.: US 7,776,951 B2
(45) Date of Patent: Aug. 17, 2010

(54) RUBBER COMPOSITION AND TIRE COMPRISING THEREOF

(75) Inventors: Tomoaki Hirayama, Kobe (JP); Takao Wada, Kobe (JP); Mamoru Uchida, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/335,590

(22) Filed: Jan. 20, 2006

(65) Prior Publication Data
US 2006/0183840 A1 Aug. 17, 2006

(30) Foreign Application Priority Data
Feb. 14, 2005 (JP) .............................. 2005-036333

(51) Int. Cl.
C08K 3/04 (2006.01)
C08L 9/00 (2006.01)
B60C 11/00 (2006.01)
B60C 13/00 (2006.01)

(52) U.S. Cl. ................. 524/495; 524/847; 524/492; 524/571; 524/572; 525/331.1; 152/209.1; 152/525; 152/547

(58) Field of Classification Search ........... 524/492, 524/495, 430, 431, 432, 571, 497, 436, 423, 524/437, 575.5, 13, 847, 572, 9; 525/331.1; 152/209.1, 525, 547
See application file for complete search history.

(56) References Cited

U.S. PATENT DOCUMENTS

| | | | | | |
|---|---|---|---|---|---|
| 2,752,979 | A | * | 7/1956 | Knill et al. | 152/504 |
| 3,420,913 | A | * | 1/1969 | Railsback | 524/496 |
| 3,921,690 | A | * | 11/1975 | Edwards | 152/510 |
| 3,933,724 | A | * | 1/1976 | Mixell | 524/342 |
| 4,038,100 | A | * | 7/1977 | Haberman | 106/472 |
| 4,237,173 | A | * | 12/1980 | Kuan | 152/524 |
| 4,987,192 | A | * | 1/1991 | Oberster et al. | 525/224 |
| 5,393,816 | A | * | 2/1995 | Kondo et al. | 524/267 |
| 5,396,940 | A | * | 3/1995 | Segatta et al. | 152/209.1 |
| 5,447,976 | A | * | 9/1995 | Curtin et al. | 523/438 |
| 5,475,051 | A | * | 12/1995 | Machurat | 524/519 |
| 6,274,662 | B1 | * | 8/2001 | Lynch et al. | 524/423 |
| 6,298,889 | B1 | * | 10/2001 | Smith | 152/151 |
| 6,344,506 | B2 | * | 2/2002 | Vasseur | 524/91 |
| 6,699,924 | B1 | * | 3/2004 | Daude | 524/431 |
| 6,710,116 | B1 | * | 3/2004 | Waddell et al. | 524/515 |
| 6,800,683 | B1 | * | 10/2004 | Daude | 524/431 |
| 6,838,495 | B2 | * | 1/2005 | Gatti et al. | 523/209 |
| 6,846,871 | B2 | * | 1/2005 | Patel et al. | 524/440 |
| 2002/0161119 | A1 | | 10/2002 | Obrecht et al. | |
| 2005/0155687 | A1 | * | 7/2005 | Amaddeo et al. | 152/539 |

FOREIGN PATENT DOCUMENTS

| | | | |
|---|---|---|---|
| CN | 1140668 | | 1/1997 |
| CN | 1322625 A | | 11/2001 |
| EP | 680 998 A1 | * | 4/1995 |
| EP | 0 680 998 A1 | | 11/1995 |
| EP | 0 901 914 A1 | | 3/1999 |
| JP | 58-168639 | * | 10/1983 |
| JP | 6-116441 A | | 4/1994 |
| JP | 8-326006 | * | 12/1996 |
| JP | 9-316233 A | | 12/1997 |
| JP | 10-231384 A | * | 9/1998 |
| JP | 11-20042 | * | 1/1999 |
| JP | 11-020042 A | * | 1/1999 |
| JP | 11-269306 A | * | 10/1999 |
| JP | 2000-101285 A | * | 4/2000 |
| JP | 2000-211315 A | * | 8/2000 |
| JP | 2001-11194 A | | 1/2001 |
| JP | 2001-81241 A | | 3/2001 |
| JP | 2002-234947 A | | 8/2002 |
| JP | 2002-309107 A | | 10/2002 |
| JP | 2003-342424 A | * | 12/2003 |
| JP | 2004-83614 A | | 3/2004 |
| JP | 2005-120166 | * | 5/2005 |
| JP | 2005-162865 A | * | 6/2005 |
| JP | 3763025 B1 | * | 1/2006 |
| JP | 3796629 B1 | * | 7/2006 |
| JP | 2006-298215 A | * | 11/2006 |
| JP | 2007-126524 A | * | 5/2007 |

OTHER PUBLICATIONS

JP 58-168639 (Oct. 1983) abstract in English.*
JP 2005-162865 A (Jun. 2005) abstract and translation in English.*
KR 2005-120003 A (Dec. 22, 2005) Heo, K. abstract in English.*
JP 11-20042 (Jan. 1999) Sugawara; abstract and translation in English.*
JP 2005-162865 A; Sakai, Hideyuki (Jun. 23, 2005); abstract and translation in English.*
JP 2007-126524 A; Toda, Hiroya (May 24, 2007); abstract and translation in English.*
Yamaguchi et al. (JP 10-231384), Sep. 1998, machine translation in English.*
Yamaguchi (JP 11-269306), Oct. 1999, machine translation in English.*
Minagawa et al. (JP 2000-211315), Aug. 2000, machine translation in English.*
Sugawara (JP 11-020042), Jan. 1999, machine translation in English.*
Kato et al. (JP 2003-342424), Dec. 2003, machine translation in English.*

* cited by examiner

*Primary Examiner*—Rip A. Lee
(74) *Attorney, Agent, or Firm*—Birch, Stewart, Kolasch & Birch LLP

(57) ABSTRACT

There is provided a rubber composition in which strength and weather resistance are improved and the use of petroleum resource is suppressed as much as possible, and a tire comprising thereof. A rubber composition comprising 3 to 12 parts by weight of a pigment derived from resources other than petroleum, 10 parts by weight or less of carbon black and 30 parts by weight or more of silica based on 100 parts by weight of rubber components comprising an epoxidized natural rubber and/or a natural rubber.

1 Claim, No Drawings

RUBBER COMPOSITION AND TIRE COMPRISING THEREOF

BACKGROUND OF THE INVENTION

The present invention relates to a rubber composition and a tire comprising thereof.

Environmental problems have become serious, and the regulation of suppressing discharge of $CO_2$ is strengthened. And also, supply amount is decreased year by year due to finite of petroleum raw materials. Therefore, the inflation of petroleum price is expected in future and there is limitation for use of the compound of a rubber composition comprising petroleum resources such as a styrene-butadiene rubber, carbon black and the like. Accordingly, anticipating the depletion of petroleum in future, it is necessary to use resources other than petroleum such as a natural rubber and fillers such as silica and calcium carbonate for the rubber composition.

However, rubber components obtained from resources other than petroleum such as a natural rubber have a problem that they are easily deteriorated by external factors such as environment using a rubber composition. In particular, in case of a rubber composition for a tire used under irradiation of sun light, cracks are easily generated in the rubber composition by absorbing ultraviolet rays by rubber components; therefore there is a problem in the weather resistance of the rubber composition. Accordingly, ultraviolet rays have been recently shielded or absorbed by compounding an antioxidant or carbon black, but both of the antioxidant and carbon black are a component derived from petroleum resources.

It has been known that a large amount of iron oxides are compounded in the rubber composition for a tire in order to improve the weather resistance of the rubber composition (see JP-A-2001-81241), but there has been a problem that the strength of the rubber composition is lowered.

SUMMARY OF THE INVENTION

It is the object of the present invention to provide a rubber composition in which strength and weather resistance are improved and the use of components derived from petroleum resources is inhibited as much as possible, and a tire comprising thereof.

The present invention relates to a rubber composition comprising 3 to 12 parts by weight of a pigment derived from a resource other than petroleum, 10 parts by weight or less of carbon black, and 30 parts by weight or more of silica based on 100 parts by weight of rubber components comprising an epoxidized natural rubber and/or a natural rubber.

Further, the present invention relates to a tire comprising the fore-mentioned rubber composition.

DETAILED DESCRIPTION

The rubber composition of the present invention comprises a rubber component, a pigment derived from resources other than petroleum, carbon black and silica.

The rubber component comprises an epoxidized natural rubber (ENR) and/or a natural rubber (NR).

ENR is prepared by adding an epoxidation agent such as peracetic acid in the emulsion of a natural rubber to be reacted. ENR used in the present invention is not specifically limited, but specifically includes ENR in which an epoxidation ratio is 25% (ENR25) and 50% (ENR50), and the like. Additionally, ENR having a different epoxidation ratio can be also used. These ENR may be used alone or in a combination of two or more.

As NR, KR7, TSR and the like which are general in the tire industry can be used.

As the rubber component, rubber components such as a styrene-butadiene rubber (SBR) and a butadiene rubber (BR) which are used in the tire industry can be used in a combination with ENR or NR, but the rubber component preferably consists of ENR and/or NR because they are resources other than petroleum and tender to environment and effect for improving strength and weather resistance is further obtained.

When the rubber composition of the present invention is used for the tread of a tire, the content ratio of ENR is 30 to 100% by weight and when it is used for the side wall, the content ratio of ENR is preferably 50% by weight or less.

Further, when the rubber composition of the present invention is used for the tread of a tire, the content ratio of NR is preferably 70% by weight or less and when it is used for the side wall, the content ratio of NR is preferably 50% by weight or more. Further, when it is used for the clinch, the content ratio of NR is preferably 100% by weight.

The pigment derived from resources other than petroleum means a colored inorganic filler and an organic pigment which are obtained from natural resources other than petroleum. These may be used alone or two or more may be used in a combination thereof.

The inorganic pigment in the present invention derived from resources other than petroleum does not include, for example, carbon black obtained by thermally decomposing petroleum, a white inorganic filler such as silica, and a transparent inorganic filler.

Examples of the inorganic pigment derived from resources other than petroleum include pigments having colors such as red, orange, yellow, green, blue, indigo blue, purple, black and brown.

The inorganic pigment derived from resources other than petroleum is preferably a colored metal oxide. The colored metal oxide means metal oxides having colors such as red, orange, yellow, green, blue, indigo blue, purple, black and brown. Specifically, ferric oxide (III), titanium oxide, aluminum oxide, zinc oxide, barium sulfate and the like are mentioned. Among these, colcothar (iron oxide (III)) and barium sulfate are preferable as the colored metal oxide, because they prevent the deterioration of a rubber by absorbing ultraviolet rays to improve light fastness.

The average particle diameter of the colored metal oxide is preferably 1 µm or less. When the average particle diameter of the colored metal oxide exceeds 1 µm, rubber strength tends to be lowered.

Further, the organic pigment derived from resources other than petroleum in the present invention includes a lake pigment which is obtained by solidifying dyes derived from charcoal and plants. Among these, charcoal is preferable as the organic pigment because effect for improving strength and weather resistance is obtained.

Charcoal means those prepared by burning resources other than petroleum such as timbers and bamboos. Specifically, the charcoal includes bincho charcoal, bamboo charcoal and the like.

The average particle diameter of the charcoal is preferably 100 µm or less and more preferably 10 µm or less. When the average particle diameter of the charcoal exceeds 100 µm, properties of a rubber such as tensile strength, tear strength and abrasion resistance tend to be lowered.

The content of the pigment derived from resources other than petroleum is 3 parts by weight or more based on 100 parts by weight of the rubber components, preferably 4 parts by weight or more and more preferably 5 parts by weight or more. When the content is less than 3 parts by weight, ultraviolet rays are not adequately absorbed by the pigment and crack is generated in the rubber composition. Further, the content of the pigment derived from resources other than petroleum is 12 parts by weight or less, preferably 11 parts by weight or less, and more preferably 10 parts by weight or less. When the content exceeds 12 parts by weight, the strength of the rubber composition is lowered.

As carbon black, carbon black such as N220, N234, N350 and N550 which have the specification generally used in the tire industry can be used. Among these, N220 carbon black is preferably used because adequate reinforcement effect for a rubber is obtained.

The content of carbon black is 10 parts by weight or less based on 100 parts by weight of the rubber components and preferably 5 parts by weight or less. When the content exceeds 10 parts by weight, it is not preferable because the ratio of components other than petroleum becomes too high in the rubber composition.

The content of silica is 30 parts by weight or more based on 100 parts by weight of the rubber components and preferably 40 parts by weight or more. When the content is less than 30 parts by weight, reinforcement effect for the rubber is little and rubber strength becomes insufficient. Further, the content of silica is preferably 90 parts by weight or less and more preferably 80 parts by weight or less. When the content exceeds 90 parts by weight, viscosity of the rubber at kneading becomes extremely high and processability at kneading, extrusion and the like tends to be deteriorated.

In the rubber composition of the present invention, a silane coupling agent can be used in a combination with silica. The silane coupling agent is not specifically limited, but specific examples include sulfides series such as bis(3-triethoxysilylpropyl)tetrasulfide, bis(2-triethoxysilylethyl)tetrasulfide, bis (3-trimethoxysilylpropyl)tetrasulfide, bis(2-trimethoxysilylethyl)tetrasulfide, bis(3-triethoxysilylpropyl)trisulfide, bis (3-triethoxysilylpropyl)disulfide, bis(3-trimethoxysilylpropyl)disulfide, 3-trimethoxysilylpropyl-N, N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzothiazolyltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane, and the like. These silane coupling agent can be used solely or in a combination use thereof. Further, the silane coupling agent can be used in a usual amount.

The rubber composition of the present invention can contain oil as a softener. As the oil, a process oil, a plant oil and fat, and a mixture thereof may be used.

The process oil includes specifically, paraffin process oil, naphthene process oil, aromatic process oil and the like.

Further, the plant oil and fat includes specifically ricinus oil, cotton seed oil, linseed oil, rape seed oil, soy bean oil, palm oil, coconut oil, peanut oil, rosin, pine oil, pine tar, tall oil, corn oil, rice oil, saffron oil, sesame oil, olive oil, sun flower oil, palm kernel oil, camellia oil, jojoba oil, macadamia nut oil, safflower oil, wood oil and the like.

In the rubber composition of the present invention, various additives such as wax, an antioxidant, stearic acid, zinc oxide, sulfur, and a vulcanization accelerator which are usually used in the tire industry can be suitably compounded, if necessary, in addition to the rubber component, a pigment derived from resources other than petroleum, silica and carbon black, and a silane coupling agent and a softener which are compounded if necessary.

The tire of the present invention comprises the rubber composition of the present invention and in particular, is preferably a tire having a tread, side wall or clinch comprising the rubber composition. In particular, the tire is preferably a tire having a tread, side wall and clinch comprising the rubber composition.

The tire of the present invention is prepared by a usual method using the rubber composition of the present invention. Namely, the rubber composition of the present invention in which the fore-mentioned rubber components, a pigment derived from resources other than petroleum, silica and carbon black, and a silane coupling agent, a softener and the fore-mentioned various additives which are compounded if necessary is extruded and molded in match with the shape of a tire member at an uncured stage and molded by a usual method on a tire molding machine to form uncured tires. Tires can be prepared by pressuring the uncured tires in a vulcanization machine by heating.

EXAMPLES

The present invention is specifically illustrated based on Examples, but the present invention is not limited thereto.

Various chemicals used in Examples are described below.

NR: TSR

ENR25: Epoxidized natural rubber (an epoxidation ratio of 25% by mol) manufactured by Kumpulan Guthrie Berhad Co. (Malaysia).

Carbon black: SHOWBLACK N220, manufactured by SHOWA CABOT K. K.

Silica: ULTRASIL VN3 manufactured by Degussa Corporation (BET specific surface area: 210 $m^2/g$).

Colcothar: Cloisonne Mark (red) manufactured by Morishita Bengara Co.

Natural charcoal: Bincho charcoal (purchased from ICHIAN of bincho charcoal; black; a particle diameter of 100 μm or less).

Pigment 1: Pigment manufactured by Toda Kogyo Corporation (iron oxide; red; a particle diameter of more than 0.5 μm and less than 5 μm).

Pigment 2: Pigment manufactured by Toda Kogyo Corporation (iron oxide; red brown; a particle diameter of 0.5 μm or less).

Silane coupling agent: Si75 manufactured by Degussa Japan Corporation.

Oil: Soy bean oil manufactured by Nissin Oillio Group Co.

Wax: SUNNOC WAX, manufactured by OUCHISHINKO CHEMICAL INDUSTRIAL CO., LTD.

Antioxidant: NOCRAC 6C (N-(1,3-dimethylbutyl)-N'-phenyl-phenylenediamine) manufactured by OUCHISHINKO CHEMICAL INDUSTRIAL CO., LTD.

Stearic acid: STEARIC ACID manufactured by NOF Corporation.

Zinc oxide: ZINC OXIDE No. 1 manufactured by Mitsui Mining And Smelting Company, Limited.

Sulfur: SULFUR POWDER manufactured by Tsurumi Chemical Industry Co., Ltd.

Vulcanization accelerator NS: NOCCELER CZ manufactured by OUCHISHINKO CHEMICAL INDUSTRIAL CO., LTD.

Examples 1 to 15 and Comparative Examples 1 to 12

After the fore-mentioned various chemicals excluding sulfur and a vulcanization accelerator which were described in Tables 1 to 3 were kneaded with 1.7 L Banbury mixer manufactured by Kobe Steel Ltd. at 140° C. for 4 minutes, sulfur and a vulcanization accelerator were compounded and kneaded with an open roll at 80° C. for 2 minutes to obtain uncured products.

The uncured products in Examples 1, 2, 5, 6, 9, 10 and 11 and Comparative Examples 1, 2, 5, 6, 9 and 10 were molded into a tread shape, the uncured articles in Examples 3, 7, 12 and 13 and Comparative Examples 3, 7 and 11 were molded into a side wall shape, and the uncured articles in Examples 4, 8, 14 and 15 and Comparative Examples 4, 8 and 12 were molded into a clinch shape, respectively. Respective treads, side walls and clinches were prepared by vulcanizing the uncured molded articles with a tread shape, a side wall shape and a clinch shape at 150° C. for 35 minutes.

Samples were cut out from the treads, the side walls and the clinches which were obtained, and were used for tests below.

(Rubber Strength)

Tensile test was carried out in accordance with JIS K6251 using the fore-mentioned rubber samples, and tensile strength at break (hereinafter referred to as TB) and elongation at break (hereinafter referred to as EB) of test pieces were respectively measured. Then, rubber strength was calculated by the formula below using TB and EB.

(Rubber strength)=$TB \times EB/2$

Further, with respect to the rubber strengths obtained, the rubber strength of Comparative Example 1 was referred to as 100 in Examples 1 to 2 and Comparative Examples 1 to 2, that of Comparative Example 3 was referred to as 100 in Example 3 and Comparative Example 3, that of Comparative Example 4 was referred to as 100 in Example 4 and Comparative Example 4, that of Comparative Example 5 was referred to as 100 in Examples 5 to 6 and Comparative Examples 5 to 6, that of Comparative Example 7 was referred to as 100 in Example 7 and Comparative Example 7, that of Comparative Example 8 was referred to as 100 in Example 8 and Comparative Example 8, further, that of Comparative Example 9 was referred to as 100 in Examples 9 to 11 and Comparative Examples 9 to 10, that of Comparative Example 11 was referred to as 100 in Examples 12 to 13 and Comparative Example 11 and that of Comparative Example 12 was referred to as 100 in Examples 14 to 15 and Comparative Example 12, and respective rubber strengths were represented by index.

(Weather Resistance)

The rubber samples which were elongated by 120% were exposed outdoor for 2 months and crack was visually observed. Those in which no crack was generated were described as "○" and those in which crack was generated were described as "×".

The test results are shown in Tables 1 to 3.

TABLE 1

|  | Ex. 1 | Ex. 2 | Com. Ex. 1 | Com. Ex. 2 | Ex. 3 | Com. Ex. 3 | Ex. 4 | Com. Ex. 4 |
|---|---|---|---|---|---|---|---|---|
| Compounding amount (parts by weight) | | | | | | | | |
| NR | 30 | 30 | 30 | 30 | 80 | 80 | 100 | 100 |
| ENR25 | 70 | 70 | 70 | 70 | 20 | 20 | — | — |
| Carbon black | 5 | 5 | 5 | 5 | 5 | 5 | 5 | 5 |
| Silica | 75 | 75 | 75 | 75 | 45 | 45 | 60 | 60 |
| Colcothar | 5 | 10 | — | 15 | 10 | — | 10 | — |
| Silane coupling agent | 6 | 6 | 6 | 6 | 3.6 | 3.6 | 4.8 | 4.8 |
| Oil | 15 | 15 | 15 | 15 | — | — | — | — |
| Wax | 1.5 | 1.5 | 1.5 | 1.5 | 1.2 | 1.2 | 1.2 | 1.2 |
| Antioxidant | 2 | 2 | 2 | 2 | 2.4 | 2.4 | 2.4 | 2.4 |
| Stearic acid | 2 | 2 | 2 | 2 | 1 | 1 | 2 | 2 |
| Zinc oxide | 3 | 3 | 3 | 3 | 3 | 3 | 3 | 3 |
| Sulfur | 1.5 | 1.5 | 1.5 | 1.5 | 1.0 | 1.0 | 2.0 | 2.0 |
| Vulcanization accelerator NS | 2.0 | 2.0 | 2.0 | 2.0 | 2.0 | 2.0 | 2.0 | 2.0 |
| Result | | | | | | | | |
| Rubber strength | 100 | 100 | 100 | 95 | 100 | 100 | 100 | 100 |
| Weather resistance | ○ | ○ | X | ○ | ○ | X | ○ | X |

TABLE 2

|  | Ex. 5 | Ex. 6 | Com. Ex. 5 | Com. Ex. 6 | Ex. 7 | Com. Ex. 7 | Ex. 8 | Com. Ex. 8 |
| --- | --- | --- | --- | --- | --- | --- | --- | --- |
| Compounding amount (parts by weight) | | | | | | | | |
| NR | 30 | 30 | 30 | 30 | 80 | 80 | 100 | 100 |
| ENR25 | 70 | 70 | 70 | 70 | 20 | 20 | — | — |
| Carbon black | 5 | 5 | 5 | 5 | 5 | 5 | 5 | 5 |
| Silica | 75 | 75 | 75 | 75 | 45 | 45 | 60 | 60 |
| Natural charcoal | 5 | 10 | — | 15 | 10 | — | 10 | — |
| Silane coupling agent | 6 | 6 | 6 | 6 | 3.6 | 3.6 | 4.8 | 4.8 |
| Oil | 15 | 15 | 15 | 15 | — | — | — | — |
| Wax | 1.5 | 1.5 | 1.5 | 1.5 | 1.2 | 1.2 | 1.2 | 1.2 |
| Antioxidant | 2 | 2 | 2 | 2 | 2.4 | 2.4 | 2.4 | 2.4 |
| Stearic acid | 2 | 2 | 2 | 2 | 1 | 1 | 2 | 2 |
| Zinc oxide | 3 | 3 | 3 | 3 | 3 | 3 | 3 | 3 |
| Sulfur | 1.5 | 1.5 | 1.5 | 1.5 | 1.0 | 1.0 | 2.0 | 2.0 |
| Vulcanization accelerator NS | 2.0 | 2.0 | 2.0 | 2.0 | 2.0 | 2.0 | 2.0 | 2.0 |
| Result | | | | | | | | |
| Rubber strength | 100 | 100 | 100 | 95 | 100 | 100 | 100 | 100 |
| Weather resistance | ○ | ○ | X | ○ | ○ | X | ○ | X |

TABLE 3

|  | Ex. 9 | Ex. 10 | Ex. 11 | Com. Ex. 9 | Com. Ex. 10 | Ex. 12 | Ex. 13 | Com. Ex. 11 | Ex. 14 | Ex. 15 | Com. Ex. 12 |
| --- | --- | --- | --- | --- | --- | --- | --- | --- | --- | --- | --- |
| Compounding amount (parts by weight) | | | | | | | | | | | |
| NR | 30 | 30 | 30 | 30 | 30 | 80 | 80 | 80 | 100 | 100 | 100 |
| ENR25 | 70 | 70 | 70 | 70 | 70 | 20 | 20 | 20 | — | — | — |
| Carbon black | 5 | 5 | 5 | 5 | 5 | 5 | 5 | 5 | 5 | 5 | 5 |
| Silica | 75 | 75 | 75 | 75 | 75 | 45 | 45 | 45 | 60 | 60 | 60 |
| Pigment 1 | 5 | 10 | — | — | 15 | 10 | — | — | 10 | — | — |
| Pigment 2 | — | — | 8 | — | — | — | 8 | — | — | 8 | — |
| Silane coupling agent | 6 | 6 | 6 | 6 | 6 | 3.6 | 3.6 | 3.6 | 4.8 | 4.8 | 4.8 |
| Oil | 15 | 15 | 15 | 15 | 15 | — | — | — | — | — | — |
| Wax | 1.5 | 1.5 | 1.5 | 1.5 | 1.5 | 1.2 | 1.2 | 1.2 | 1.2 | 1.2 | 1.2 |
| Antioxidant | 2 | 2 | 2 | 2 | 2 | 2.4 | 2.4 | 2.4 | 2.4 | 2.4 | 2.4 |
| Stearic acid | 2 | 2 | 2 | 2 | 2 | 1 | 1 | 1 | 2 | 2 | 2 |
| Zinc oxide | 3 | 3 | 3 | 3 | 3 | 3 | 3 | 3 | 3 | 3 | 3 |
| Sulfur | 1.5 | 1.5 | 1.5 | 1.5 | 1.5 | 1.0 | 1.0 | 1.0 | 2.0 | 2.0 | 2.0 |
| Vulcanization accelerator NS | 2.0 | 2.0 | 2.0 | 2.0 | 2.0 | 2.0 | 2.0 | 2.0 | 2.0 | 2.0 | 2.0 |
| Result | | | | | | | | | | | |
| Rubber strength | 100 | 100 | 100 | 100 | 95 | 100 | 100 | 100 | 100 | 100 | 100 |
| Weather resistance | ○ | ○ | ○ | X | ○ | ○ | ○ | X | ○ | ○ | X |

According to the present invention, there can be provided a rubber composition in which strength and weather resistance are improved and the use of components derived from petroleum resources is inhibited as much as possible, and a tire comprising thereof, by containing a specific rubber component, carbon black and silica, and further, a pigment derived from resources other than petroleum.

What is claimed is:

1. A tire having a tread, a sidewall and a clinch, wherein the tread, sidewall or clinch is formed from a rubber composition comprising 3 to 12 parts by weight of an organic pigment derived from resources other than petroleum, 5 parts by weight or less of carbon black and 30 to 90 parts by weight of silica based on 100 parts by weight of rubber components comprising an epoxidized natural rubber, wherein said organic pigment derived from resources other than petroleum is charcoal.

* * * * *